(12) United States Patent
Holmes et al.

(10) Patent No.: US 11,142,296 B2
(45) Date of Patent: Oct. 12, 2021

(54) APPARATUS FOR LAMINAR FLOW CONTROL

(71) Applicant: AIRBUS OPERATIONS LIMITED, Bristol (GB)

(72) Inventors: Vernon Holmes, Bristol (GB); Rodney Evans, Bristol (GB)

(73) Assignee: Airbus Operations Limited, Bristol (GB)

( * ) Notice: Subject to any disclaimer, the term of this patent is extended or adjusted under 35 U.S.C. 154(b) by 392 days.

(21) Appl. No.: 16/165,260

(22) Filed: Oct. 19, 2018

(65) Prior Publication Data
US 2019/0118923 A1    Apr. 25, 2019

(30) Foreign Application Priority Data

Oct. 20, 2017    (GB) ...................................... 1717307

(51) Int. Cl.
*B64C 21/06* (2006.01)
*B64C 1/00* (2006.01)
(Continued)

(52) U.S. Cl.
CPC .............. *B64C 1/0009* (2013.01); *B64C 3/26* (2013.01); *B64C 21/06* (2013.01); *F15D 1/0055* (2013.01);
(Continued)

(58) Field of Classification Search
CPC ......... B64C 1/0009; B64C 3/26; B64C 21/06; B64C 2230/08; B64C 2230/22; F15D 1/0055
See application file for complete search history.

(56) References Cited

U.S. PATENT DOCUMENTS

| 2,111,530 A | 3/1938 | Seversky |
| 2,742,247 A | 4/1956 | Lachmann |

(Continued)

FOREIGN PATENT DOCUMENTS

| DE | 4436748 C1 | 9/1995 |
| DE | 10 2010 014 640 A1 | 10/2011 |

(Continued)

OTHER PUBLICATIONS

European Search Report cited in EP 18201331.8 dated Jan. 29, 2019, 8 pages.

(Continued)

*Primary Examiner* — Justin M Benedik
(74) *Attorney, Agent, or Firm* — Nixon & Vanderhye P.C (57) ABSTRACT

Apparatus for laminar flow control for a skin panel for an aircraft including a body for receipt into a recess of the skin panel. The body defines a chamber. The body includes an outer portion defining one or more micro apertures through the outer portion, each of the one or more micro apertures being in fluid communication with the chamber. The body includes a support portion supporting the outer portion, the support portion defining at least one outlet for allowing air to be drawn from the chamber in use by a suction means in fluid communication with the outlet in use. The apparatus is arranged such that, in use, air is drawn through the one or more micro apertures into the chamber and out of the outlet, thereby to promote laminar airflow over the outer portion in use.

19 Claims, 6 Drawing Sheets

(51) Int. Cl.
*B64C 3/26* (2006.01)
*F15D 1/00* (2006.01)

(52) U.S. Cl.
CPC ...... *B64C 2230/04* (2013.01); *B64C 2230/06* (2013.01); *B64C 2230/08* (2013.01); *B64C 2230/20* (2013.01); *B64C 2230/22* (2013.01)

(56) References Cited

U.S. PATENT DOCUMENTS

| | | | |
|---|---|---|---|
| 3,213,527 | A | 10/1965 | Glaze |
| 4,000,869 | A | 1/1977 | Wong |
| 4,575,030 | A | 3/1986 | Gratzer |
| 4,807,831 | A * | 2/1989 | Brewer ............... B64C 23/00 244/117 A |
| 5,263,667 | A | 11/1993 | Horstman |
| 5,366,177 | A | 11/1994 | DeCoux |
| 5,398,410 | A | 3/1995 | Yasui et al. |
| 5,743,488 | A | 4/1998 | Rolston et al. |
| 5,806,796 | A | 9/1998 | Healey |
| 5,899,416 | A | 5/1999 | Meister et al. |
| 5,923,003 | A | 7/1999 | Arcas et al. |
| 6,050,523 | A | 4/2000 | Kraenzien |
| 6,135,395 | A | 10/2000 | Collett |
| 6,612,524 | B2 | 9/2003 | Billman et al. |
| 6,622,973 | B2 | 9/2003 | Al-Garni et al. |
| 6,752,358 | B1 | 6/2004 | Williams et al. |
| 7,048,230 | B2 | 5/2006 | Meyer |
| 7,743,884 | B2 | 6/2010 | Thomas et al. |
| 8,091,837 | B2 | 1/2012 | Frankenberger et al. |
| 8,282,037 | B2 | 10/2012 | Ashok |
| 8,459,597 | B2 | 6/2013 | Cloft et al. |
| 8,596,573 | B2 | 12/2013 | Ashok |
| 9,193,443 | B2 | 11/2015 | Voege |
| 10,005,545 | B2 | 6/2018 | Aldermand et al. |
| 2003/0132351 | A1 | 7/2003 | Billman et al. |
| 2005/0045774 | A1 | 3/2005 | Hocking |
| 2005/0151026 | A1* | 7/2005 | Meyer ............... B64D 33/02 244/204 |
| 2007/0221788 | A1 | 9/2007 | Meister |
| 2008/0296439 | A1 | 12/2008 | Cloft et al. |
| 2009/0210103 | A1 | 8/2009 | Cook |
| 2009/0212165 | A1 | 8/2009 | Parkh |
| 2010/0187360 | A1 | 7/2010 | Rawlings et al. |
| 2010/0187361 | A1 | 7/2010 | Rawlings et al. |
| 2010/0294892 | A1 | 11/2010 | Syassen |
| 2011/0117338 | A1 | 5/2011 | Poquette et al. |
| 2011/0212291 | A1 | 9/2011 | Buellesbach |
| 2014/0021304 | A1 | 1/2014 | Gerber et al. |
| 2016/0107746 | A1* | 4/2016 | Tiwari ............... B23K 26/382 137/565.23 |
| 2017/0267332 | A1* | 9/2017 | Ruppert ............... B64C 21/025 |

FOREIGN PATENT DOCUMENTS

| | | |
|---|---|---|
| DE | 10 2010 014 641 A1 | 10/2011 |
| DE | 10 2010 036 154 A1 | 3/2012 |
| EP | 0 599 502 | 6/1994 |
| EP | 2 810 870 | 12/2014 |
| EP | 2 891 606 A1 | 7/2015 |
| EP | 3 009 346 | 4/2016 |
| EP | 3 020 631 | 5/2016 |
| EP | 3 093 236 | 11/2016 |
| EP | 3 205 575 | 8/2017 |
| GB | 718421 | 11/1954 |
| GB | 2234351 A | 10/1998 |
| GB | 2 402 196 | 12/2004 |
| WO | 9221560 | 12/1992 |
| WO | 9847761 | 10/1998 |
| WO | 01/00488 | 1/2001 |
| WO | 2011/128 069 A1 | 10/2011 |

OTHER PUBLICATIONS

Wong et al. "Drag Reduction Using Boundary Layer Suction and Blowing", CEAS/KATnet Conference on Key Aerodynamic Technologies (Jun. 2005).

Schrauf et al, "Simplified Hybrid Laminar Flow Control", European Congress on Computational Methods in Applied Science and Engineering CCOMAS 2004 (Jul. 2004).

Schrauf "Status and Perspective of Laminar Flow" The Aeronautical Journal, vol. 109, pp. 639-644 (Dec. 2005).

Wagner et al, "Laminar Flow Control Leading Edge Systems in Simulated Airline Service," 16th Congress of the International Council of the Aeronautical Sciences (Aug. 1988).

Braslow "A History of Suction-Type Laminar Flow Control with Emphasis on Flight Research", NASA History Division, Monographs in Aerospace History, No. 13 (1999).

Wong et al, "Studies of Methods and Philosophies for Designing Hybrid Laminar Flow Wings," ICAS 2000 Congress, pp. 282.1 to 282.11 (Aug. 2000).

Joslin, "Aircraft Laminar Flow Control", Annular Review of Fluid Mechanics, vol. 30; pp. 1-29 (1998).

Henke, "A 320 HLF Fin: Flight Test Completed", Air & Space Europe, vol. 1, No. 2 (1999).

"Hight Reynolds Number Hybrid Laminar Flow Control (HLFC) Flight Experiment: IV Suction System Design and Manufacture", NASA/CR-1999-209326 (Apr. 1999).

Schmitt et al, "Hybrid Laminar Fin Investigation", Paper RTO AVT Symposium on Active Technology for Enhanced Performance Operational Capabilities of Military Aircraft, Land Vehicles and Sea Vehicles, RTO MP-051 (May 2000).

Search Report for DE 10 2017 115 558.9, dated Mar. 5, 2018, 9 pages.

* cited by examiner

APPARATUS FOR LAMINAR FLOW CONTROL

RELATED APPLICATION

This application claims priority to United Kingdom Patent Application GB 1717307.1, filed Oct. 20, 2017, the entire contents of which is incorporated by reference.

TECHNICAL FIELD

The present invention relates to laminar flow control, and more specifically to an apparatus for laminar flow control for a skin panel for an aircraft.

BACKGROUND

The effects of viscosity of airflow in the immediate vicinity of a bounding surface such as an aircraft skin can be significant. Airflow that is slowed down or stopped by viscosity contributes to skin friction drag, and hence to the overall drag of an aircraft. Boundary layer airflow over an aircraft skin for example begins at a leading edge as a smooth laminar flow but can break down into a turbulent flow downstream. Laminar airflow is a smooth flow and creates less skin friction drag, whereas turbulent airflow contains eddies and creates more skin friction drag. It is therefore desirable to maintain laminar flow over aircraft skin.

A known technique of maintaining laminar flow is by shaping an airfoil to control the pressure distribution over the airfoil. This is known as Natural Laminar Flow (NLF). However, maintaining laminar flows in such airfoils requires smooth, wave free surfaces, which can be difficult and expensive to produce and maintain. For example, commercial aircraft have skin panels that are joined together, which joins can disrupt laminar flow.

Another technique of maintaining laminar flow is by Laminar Flow Control (LFC), where an air pump is used to extract the boundary layer airflow and hence reduce boundary layer separation that can result in turbulent airflow. The combination of laminar flow control (LFC) at a leading edge and natural laminar flow (NLF) aft of the leading edge is referred to a hybrid laminar flow control (HLFC). However, realisation of the application of such techniques in commercial aircraft is difficult.

SUMMARY

According to a first aspect of the present invention, there is provided apparatus for laminar flow control for a skin panel for an aircraft, the apparatus comprising: a body for receipt into a recess of the skin panel in use, the body defining a chamber, the body comprising: an outer portion for alignment with an outer surface of the skin panel when the body is received in the recess of the skin panel in use, the outer portion defining one or more micro apertures through the outer portion, each of the one or more micro apertures being in fluid communication with the chamber; and a support portion supporting the outer portion, the support portion defining at least one outlet for allowing air to be drawn from the chamber in use by a suction means in fluid communication with the outlet in use; wherein the apparatus is arranged such that, in use, air is drawn through the one or more micro apertures into the chamber and out of the outlet, thereby to promote laminar airflow over the outer portion in use.

Optionally, the support portion comprises a base portion and one or more support members supporting the outer portion, the one or more support members extending from the base portion.

Optionally the chamber is defined between the base portion, the outer portion, and the support members.

Optionally, the outlet is defined in the base portion.

Optionally, the outlet comprises a connecting means for connecting the outlet to the suction means in use.

Optionally, the outer portion is integrally formed with the support portion.

Optionally, the outer portion is bonded to the support portion.

Optionally, each of the one or more micro apertures has a diameter of substantially 55±10 µm.

Optionally, the outer portion has a thickness in the range 0.8 mm to 1.0 mm.

Optionally, the apparatus is arranged for hybrid laminar flow control for an aircraft.

Optionally, the body is for bonding into a recess of a skin panel for an aircraft.

Optionally, the body is a joint strap for joining a first said skin panel to a second said skin panel for an aircraft.

Optionally, the body comprises one or more fastener receiving portions each for receiving a fastener for fastening the body to the first or second said skin panel in use.

Optionally, one or more of the micro apertures are adjacent to one or more of the fastener receiving portions.

Optionally, one or more of the micro apertures are positioned such that in use the one or more micro apertures are immediately downstream of one or more of the fastener receiving portions.

Optionally, one or more of the fastener receiving portions each comprise a said support member, the support member defining an aperture for receiving the fastener.

According to a second aspect of the present invention, there is provided a system for laminar flow control for an aircraft, the system comprising: at least one skin panel comprising a recess; and the apparatus according to the first aspect, the apparatus being received in the recess.

Optionally, the system comprises a first skin panel and a second skin panel, and the body of the apparatus is a joint strap that joins the first skin panel to the second skin panel.

Optionally, the first skin panel comprises a first recess in which a first portion of the body of the apparatus is received, and the second skin panel comprises a second recess in which a second portion of the apparatus is received.

Optionally, the system comprises one or more first fasteners fastening the first portion of the body of the apparatus to the first skin panel, and one or more second fasteners fastening the second portion of the body of the apparatus to the second skin panel.

Optionally, the first recess and/or the second recess comprises a rebated or joggled portion into which the respective first and/or second portion of the body of the apparatus is received.

Optionally, an outer surface of the outer portion is aligned with an outer surface of the first skin panel and an outer surface of the second skin panel.

Optionally, the first skin panel is a leading-edge skin panel of a wing of an aircraft, and the second skin panel is a wing box skin panel of a wing of an aircraft.

Optionally, the first skin panel and the second skin panel define between them a gap, and the outlet of the apparatus is located substantially at the gap.

Optionally, the apparatus is received in a recess defined in one skin panel.

Optionally, an outer surface of the outer portion of the body of the apparatus is aligned with an outer surface of the skin panel.

Optionally, the body of the apparatus is bonded to the skin panel.

Optionally, the skin panel defines an aperture extending from the recess to an inner surface of the skin panel, and the outlet of the body is located at the aperture.

Optionally, the skin panel is one of a leading-edge skin panel for an aircraft wing and a wing box skin panel of an aircraft wing.

Optionally, the apparatus is positioned such that in use the apparatus is downstream of an air flow disturbance feature.

Optionally, the system comprises the suction means connected to the outlet of the apparatus, the suction means being arranged to draw air from the chamber in use.

According to a third aspect of the present invention, there is provided a wing for an aircraft comprising the apparatus according to the first aspect, or the system according to the second aspect.

According to a fourth aspect of the present invention, there is provided an aircraft comprising the apparatus according to the first aspect, or the system according to the second aspect, or the wing according to the third aspect.

According to fifth aspect of the present invention, there is provided laminar flow control apparatus comprising: an element for insertion into a recess of a skin panel of an aircraft, the element defining: an internal cavity; at least one micro aperture fluidically connecting the internal cavity to an exterior of the element; and at least one outlet, in fluid communication with the internal cavity, for connection to a suction means; wherein in use a said suction means connected to the at least one outlet in use draws air from the internal cavity thereby to cause air to be drawn in to the internal cavity from the exterior of the element via the at least one micro aperture, thereby to encourage laminar flow of air over the element in use.

Further features and advantages of the invention will become apparent from the following description of preferred embodiments of the invention, given by way of example only, which is made with reference to the accompanying drawings.

DETAILED DESCRIPTION

Referring to FIGS. 1 to 6, there is illustrated a system 1 comprising an apparatus 2 for laminar flow control for a skin panel 4, 6 for an aircraft (not shown in FIGS. 1 to 6, but see aircraft 80 of FIG. 8), according to a first example.

In broad overview, the system 1 comprises the apparatus 2 for laminar flow control, received in one or more skin panels 4, 6 for an aircraft. The apparatus 2 comprises a body 8 defining a chamber 18. In use, air is drawn through one or more micro apertures 20 defined in an outer portion 14 of the body 8, into the chamber 18 and out of one or more outlets 22 by a suction means (not shown), thereby to promote laminar flow of air over the outer portion 14. The skin friction drag of the portion of the aircraft (not shown) in which the apparatus 2 is implemented may therefore be reduced, and hence efficiency increased.

The apparatus 2 may arranged for hybrid laminar flow control for the aircraft. For example, the apparatus 2 may provide for laminar flow control suction at or near a leading-edge skin panel with natural laminar flow being provided downstream (i.e. aft) thereof. In this first illustrated example, the body 8 is a joint strap or butt strap 8 for joining a first skin panel 4 of an aircraft to a second skin panel 6 for an aircraft. For example, referring briefly to FIG. 8, the body 8 may be a joint strap or butt strap 8 for joining a leading-edge skin panel 4 of a wing 10 of an aircraft 7 to a wing box skin panel 6 of the wing 10 of the aircraft. The apparatus 2 may therefore be for hybrid laminar flow control for the aircraft.

The joint strap 8 for connecting skin panels also providing laminar flow control may help to reduce weight and space associated with providing structures for these functions separately, and hence may help improve aircraft operational efficiency. This arrangement may also reduce the need to modify portions of the aircraft other than the joint strap 8 in order to provide for laminar flow control, thereby to reduce the cost and complexity associated such modifications. Furthermore, providing laminar flow control in a joint strap 8 may allow for flow control to be implemented immediately downstream of fastener heads (30b, see e.g. FIG. 3) associated with joint straps 8, and hence may reduce turbulent flow resulting therefrom, which otherwise may lead to increased skin friction drag.

Referring again to FIGS. 1 to 6, the body 8 of the apparatus 2 has the form of an elongate cuboid. The body 8 comprises a support portion 12 supporting the outer portion 14. The outer portion 14 defines an outer surface 14a over which air flows in use.

The first skin panel 4 and the second skin panel 6 each define an outer surface 4a, 6a forming part of the outer surface of the aircraft over which air flows in use. The first skin panel 4 is rebated so as to define a first recess 13, and the second skin panel 6 is rebated so as to define a second recess 15. The body 8, specifically the support portion 12, is received in the first recess 13 of the first skin panel 4 and in the second recess 15 of the second skin panel 6. The outer surface 14a of the outer portion 14 is aligned (i.e. substantially flush) with the outer surface 4a of the first skin panel 4 and with the outer surface 6a of the second skin panel 6. This can help to minimise aero-disturbance caused by the body 8.

The outer portion 14 has the form of a generally rectangular plate. The outer portion 14 is substantially planar. The outer portion 14 may be formed from titanium or corrosion resistant steel (CRES), for example stainless steel. The outer portion 14 may have a thickness in the range 0.8 mm to 1.0 mm, for example 0.9 mm.

Figure 1:
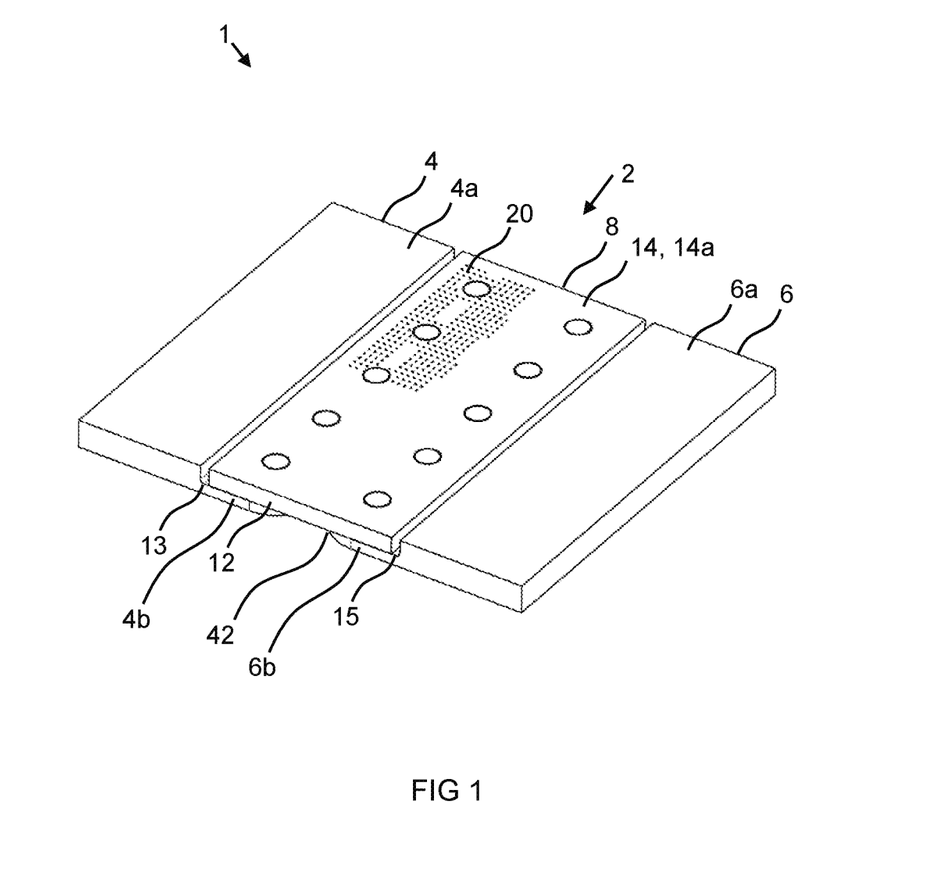
FIG. 1 illustrates schematically a perspective view of a system comprising an apparatus for laminar flow control, according to a first example.
Figure 2:
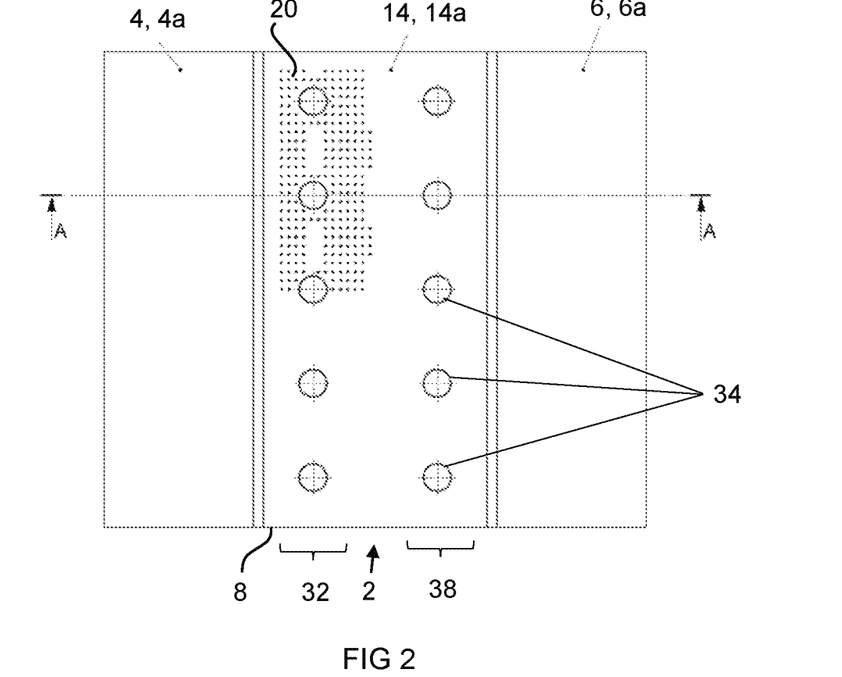
FIG. 2 illustrates schematically a plan view of the system of FIG. 1.
Figure 3:
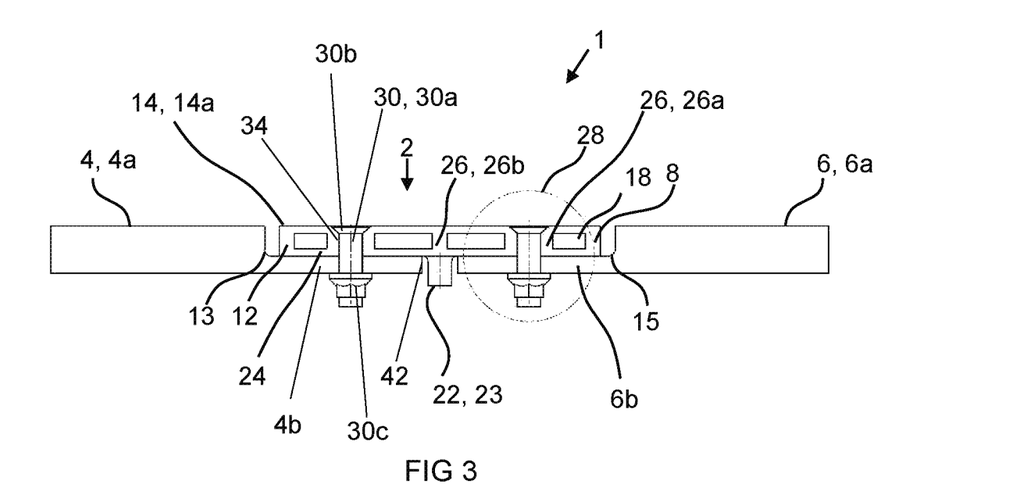
FIG. 3 illustrates schematically a part cutaway view through section A-A of the system of FIG. 2.
Figure 4:
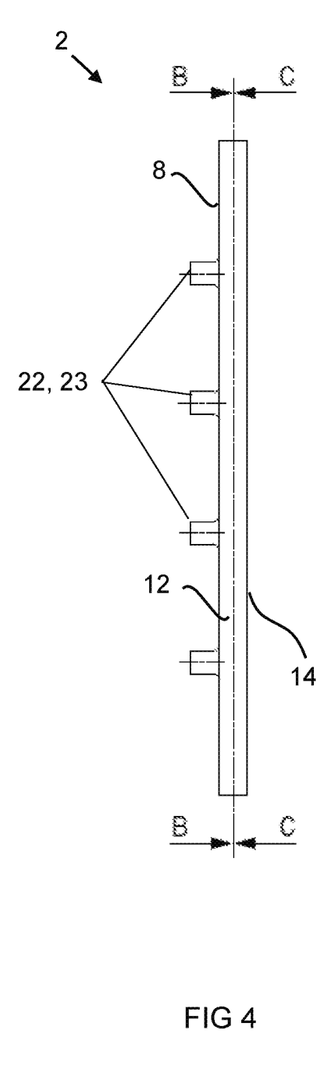
FIG. 4 illustrates schematically a side view of the apparatus of FIG. 1.
Figure 6:
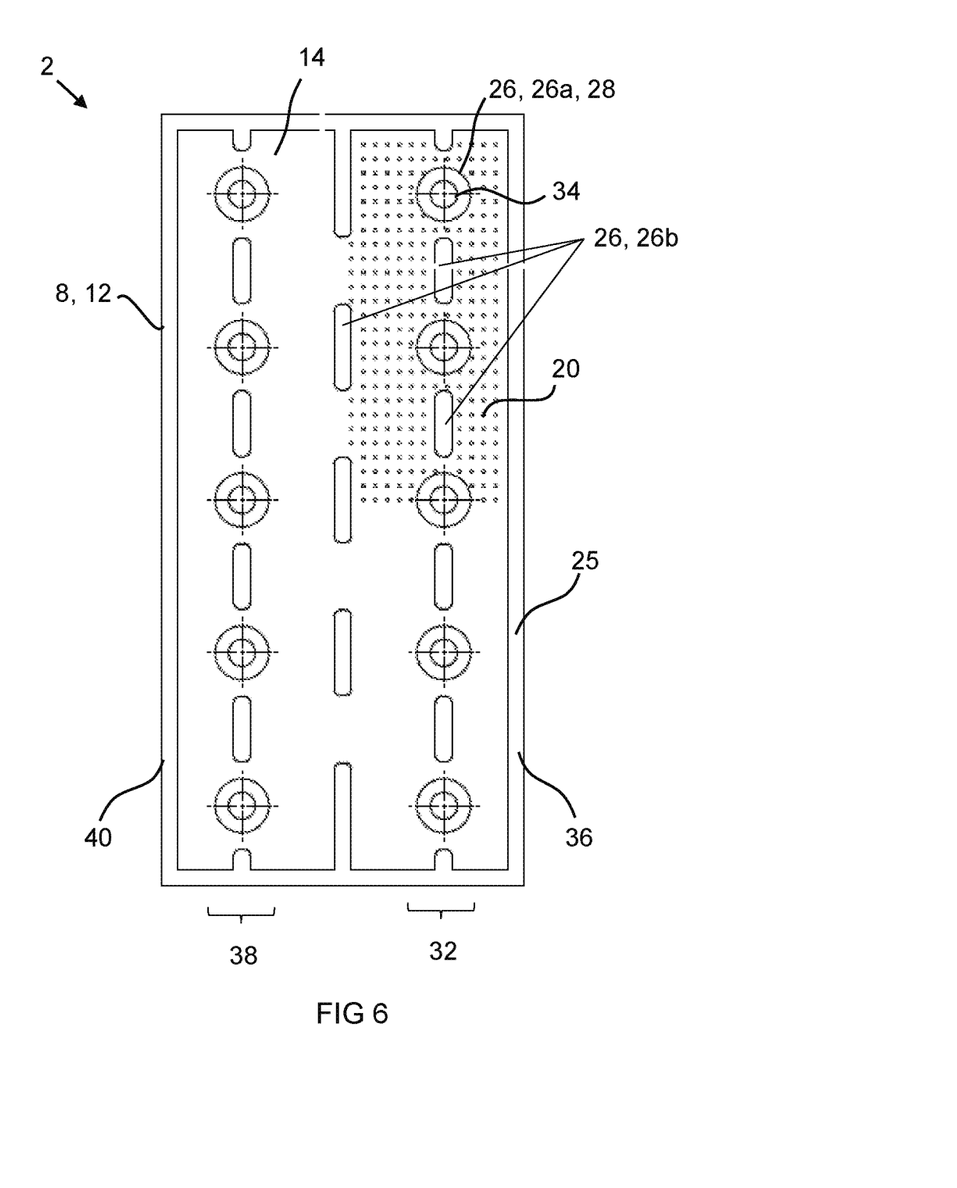
FIG. 6 illustrates schematically a part cutaway view through the section B-B of the apparatus of FIG. 4.

The outer portion 14 defines a plurality of micro apertures 20 through the outer portion 14 (micro apertures 20 are not shown in FIG. 3, but see e.g. FIGS. 1, 2, and 6). The plurality of micro apertures are distributed substantially evenly over the outer portion 14. Although for simplicity in FIGS. 1, 2 and 6 the micro apertures 20 are illustrated as only covering a portion of the outer portion 14, it will be appreciated that the micro apertures 20 may be distributed over the entirety of the outer portion 14. Each of the micro apertures 20 are in fluid communication with the chamber 18.

Each micro aperture 20 may have a substantially circular cross-section. For example, the circularity, defined as the minimum diameter of the micro aperture 20 at a given point along the length of the micro aperture 20 divided by the maximum diameter of the micro aperture at the given point, may be greater than or equal to 0.9. In some examples, each micro aperture may be substantially cylindrical. Each micro aperture 20 may extend along an axis that is substantially perpendicular to the outer surface 14a of the outer portion 14. For example, the axis along which each micro aperture extends may make an angle of 90±5° with the plane of the outer surface 14a of the outer portion 14. Each of the micro apertures 20 may have a diameter of, for example, 55±10 μm. Each micro aperture 20 may be formed by laser drilling, for example. Each micro aperture 20 may be tapered in shape, for example may be frustroconical in shape. For example, the diameter of a micro aperture 20 at a first surface (for example the outer surface 14a) of the outer portion 14 may be smaller than the diameter of the micro aperture 20 at a second surface (for example an inner surface) of the outer portion 14. For example, the ratio of the diameter of a micro aperture 20 at the first surface (for example the outer surface 14a) of the outer portion 14 to the diameter of the micro aperture 20 at the second surface (for example the inner surface) of the outer portion 14 may be in the range 1 to 2. The pitch of the micro apertures 20 (i.e. the distance between one micro aperture 20 and adjacent micro apertures 20) may be, for example, 720±35 μm. It will be appreciated that in FIGS. 1, 2 and 6 the diameter and pitch of the micro apertures 20 has been exaggerated for ease of visualisation.

Figure 5:
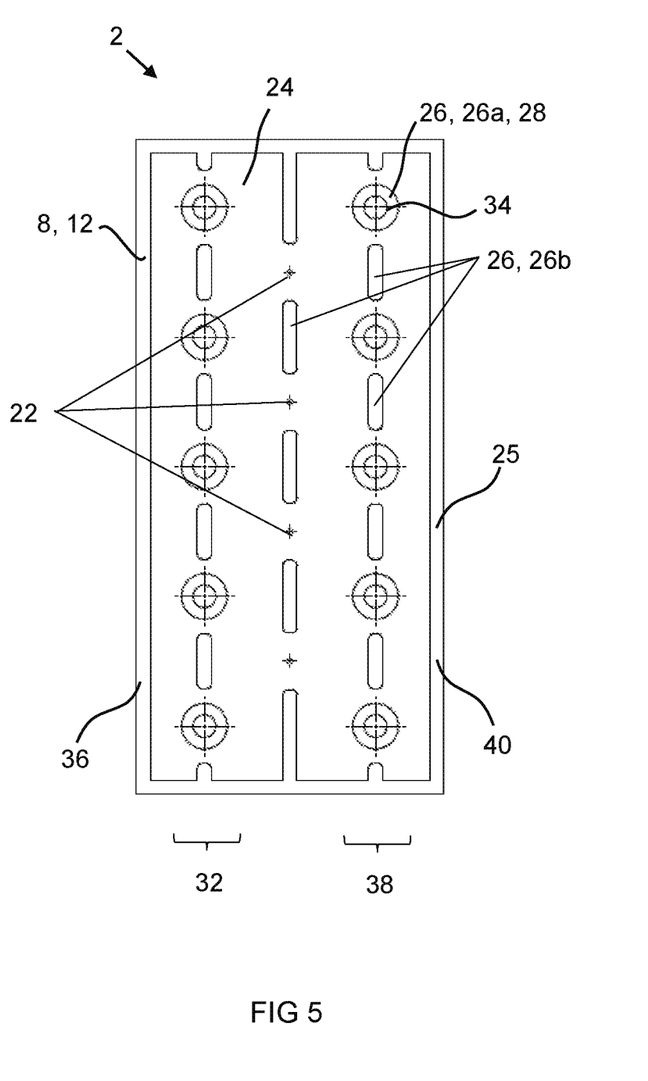
FIG. 5 illustrates schematically a part cutaway view through section C-C of the apparatus of FIG. 4.

As perhaps best seen in FIGS. 3 and 5, the support portion 12 comprises a base portion 24, and a wall portion 25. The wall portion 25 extends from the perimeter of the base portion 24 to the outer portion 14, so as to support the outer portion 14 at its perimeter. The base portion 24, wall portion 25, and outer portion 14 together enclose the chamber 18. The support portion 12 also comprises a plurality of support members 26 supporting the outer portion 14. Each support member 26 extends from the base portion 24 to the outer portion 24. The outer portion 14 may be integrally formed with the support portion 12. For example, the body 8 may be manufactured as a single piece using additive manufacturing processes or by wax casting. For example, the body 8 may made as a single piece from titanium by a titanium 3D printing process. In another example, the outer portion 14 may be formed as a separate piece to the support portion 12, and then fixedly attached to the support portion 12, for example by suitable bonding.

As perhaps best seen in FIG. 5, first support members 26a that are substantially annular are substantially regularly distributed over the base portion 24. Intermediate of adjacent first support members 26a are second support members 26b that are elongate in cross section. The chamber 18 is defined between the base portion 24, the wall portion 25, the outer portion 14, and the support members 26. Air may therefore flow from any one of the micro apertures 20 to any one of one or more outlets 22, via the chamber 18.

The body 8 comprises a plurality of fastener receiving portions 28. Each fastener receiving portion 28 comprises an aperture 34 extending through the body 8 so as to allow a fastener 30 to be inserted therethrough. The aperture 34 extends through the outer portion 14 and the support portion 12. In this example, each fastener receiving portion 28 comprises one of the first support members 26a. In other words, each first support member 26a partly defines the aperture 34 for receiving a fastener 30. Using a support member 26 as a fastener receiving portion 28 may help reduce weight and space associated with providing separate structures for each purpose, and may improve aircraft operating efficiency.

As perhaps best seen in FIG. 3, each fastener receiving portion 28 has received therein a fastener 30 for fastening the body 8 to the first skin panel 4 or for fastening the body 8 to the second skin panel 8. The rebated skin portions 4,6 each comprise a flange 4b, 6b partially defining the recess 13, 15, in which the body 8 is received, and the fasteners 30 fasten the body 8 to each flange 4b, 6b, thereby joining the first skin panel 4 and the second skin panel 6 to together.

The aperture 34 of each fastener receiving portion 28 is countersunk to allow a fastener head 30b of the fastener 30 to lie flush with the outer surface 14a of the outer portion 14. In the example illustrated in FIG. 3, the fastener 30 comprises a bolt 30a having a bolt head 30b, and a corresponding nut 30c. The bolt 30 extends through the aperture 34 of the fastener receiving portion 28, and extends through an aperture 4b, 6b of the flange 4b, 6b of the skin panel 4, 6, and a nut is secured on a thread on an opposite end of the bolt 30 to the bolt head 30a.

As perhaps best seen in FIG. 5, the body 8 has a first set 32 of fastener receiving portions 28 towards a first side 36 of the body 8, and a second set 38 of fastener receiving portions 28 towards a second, opposite side 40 of the body 8. The first set 32 are for receiving fasteners 30 for fastening the body 8 to the first skin panel 4, and the second set are for receiving fasteners 30 for fastening the body 8 to the second skin panel 6. In such a way, the body 8 acts as a butt or joint strap 8 joining the first skin panel 4 and the second skin panel 6 together.

The support portion 12 defines the one or more outlets 22. In this example, there are a plurality of outlets 22. Each outlet 22 is for allowing air to be drawn from the chamber 18 by a suction means (not shown) in fluid communication with the outlet 22. Each outlet 22 is defined in the base portion 24. Each outlet 22 is located substantially at a gap 42 defined between the first skin panel 4 and the second skin panel 6. Each outlet 22 comprises a connecting means 23 for connecting the outlet 22 to the suction means (not shown). The connecting means 23 extends into the gap 42, to allow for example a pipe of a suction means to be attached thereto. In the example illustrated in FIGS. 1 to 6, the connecting means 23 is a projection of the base portion 24 of the support portion 12 of the body 8. However, in other examples, (not shown) the connecting means 23 may be a separate component to the base portion 24, for example a fluid connection fitting (not shown), and may for example comprise a screw thread to allow a connection pipe (not shown) of the suction means (not shown) to be suitably connected to the connecting fitting (not shown).

The suction means (not shown) may be, for example an air pump, for example an electric air pump, that is driven so as to draw air out of the chamber 18 via each outlet 22 to which it is connected, thereby to reduce the pressure of air within the chamber 18. Using a driven suction means (not shown) with the apparatus 2 may be referred to as active laminar flow control, for example active hybrid laminar flow control. In other examples, the suction means may be passive. For example, the outlet 22 may be in fluid communication with a low pressure zone of the aircraft in flight, for example at or near a trailing edge of the aircraft. In flight, the pressure difference between the air at the low pressure zone and the air in the chamber 18 causes the air to be drawn from the chamber 18. This may be referred to as passive laminar flow control, for example passive hybrid laminar flow control.

In use, for example when an aircraft (for example aircraft 80 of FIG. 8) comprising the laminar flow control system 1 is in flight, air flows over the outer surface 4a of the first skin panel 4, which may be for example a leading edge skin panel 4 of a wing (see for example wing 70 of FIG. 7) of the aircraft, flows over the outer surface 14a of the outer portion 14 of the body 8 of the laminar flow control apparatus 1, and flows over the outer surface 6a of the second skin panel 6, which may be for example a wing box skin panel 6 of the wing of the aircraft. The airflow is relatively high velocity. The airflow may be laminar airflow at or near the first skin panel 4, but may tend to break down into turbulent airflow as it travels over the first skin panel 4, the outer portion 14, and/or the second skin panel 6. However, the suction means (not shown) in fluid communication with each outlet 22 draws air from the chamber 18, which reduces the air pressure in the chamber 18. The resulting pressure gradient between the relatively low pressure in the chamber 18 and the relatively high air pressure at the outer surface 14a of the outer portion 14 of the body 8 of the apparatus 1 draws air flowing at or near the outer surface 14a through the micro apertures 20 and into the chamber 18. This reduces airflow layer separation at the outer surface 14a which otherwise may contribute to the breakdown of the laminar airflow to turbulent airflow. Turbulent airflow over the outer portion 14 and skin panels 4, 6 is thereby reduced, and correspondingly laminar airflow is thereby promoted.

Although the fastener heads 30b are substantially flush with the outer surface 14a of the outer portion 14 of the body 8 of the apparatus 1 to minimise aero disturbances, small misalignments of the fastener heads 30b with respect to the outer surface 14a, for example due to tolerances associated with the manufacture and/or installation of the fasteners 30, may occur and hence the fastener heads 30b may nonetheless cause turbulent airflow to form over the outer surface 14. However, at least some of the plurality of micro apertures 20 may be adjacent to, for example immediately downstream (i.e. aft) of, one or more of the fasteners 30. This may help to reduce the impact of the fasteners on laminar airflow over the body 8 and skin panels 4, 6 and hence reduce skin friction drag, for example as compared to a system in which micro apertures 20 were not adjacent to or immediately downstream of the fasteners 30.

Figure 7:
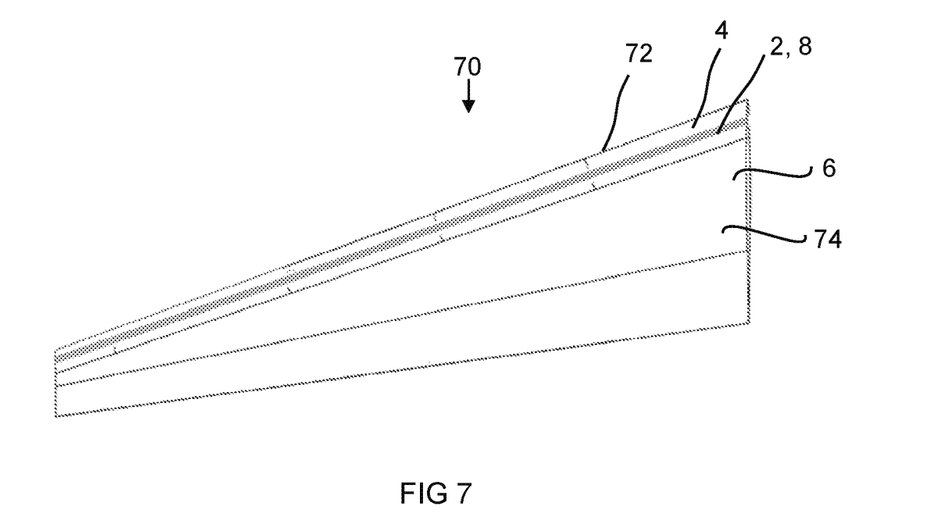
FIG. 7 illustrates schematically a wing of an aircraft according to an example.
Figure 8:
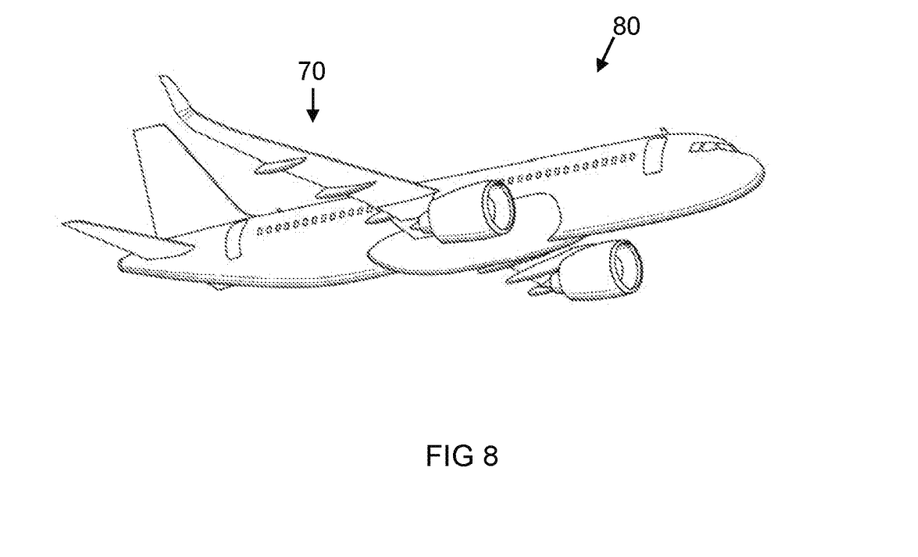
FIG. 8 illustrates schematically an aircraft according to an example.

FIG. 7 illustrates an example aircraft wing 70 in which the system 1 or apparatus 2 for laminar flow control may be implemented, according to an example. FIG. 8 illustrates an example aircraft 80 in which the system 1 or apparatus 2 for laminar flow control 1 may be implemented, according to an example. For example, the aircraft 80 may comprise the wing 70. The illustrated aircraft 80 is a short range passenger aircraft, but may be any aircraft, for example a medium range or long range passenger aircraft.

The wing 70 comprises a leading edge portion 72 and a wing box portion 74. The leading edge portion 72 comprises one or more leading edge skin panels 4. In this example, the leading edge skin panels 4 are upper leading edge skin panels 4, i.e. located on the suction surface (rather than the pressure surface) of the wing 70. The wing box portion 74 comprises one or more wing box skin panels 6. The wing 70 comprises the apparatus 1 for laminar flow control described above with respect to FIGS. 1 to 6. The body 8 of the apparatus is a joint strap 8 that joins one or more of the leading edge skin panels 4 to one or more of the wing box skin panels 6. The wing 70 may provide natural laminar flow (NLF), for example the wing may be shaped to control the pressure distribution over the wing to promote laminar flow. The apparatus 1 being positioned at or near the leading edge portion 72 may provide for laminar flow control (LFC) to be combined with natural laminar flow (NLF), and for hybrid laminar flow control (HLFC). This may help improve laminar airflow over the wing 70, and hence improve efficiency.

The apparatus 2 may comprise a plurality of the bodies 8 as described above, and accordingly the wing 70 may comprise a plurality of the bodies 8. For example, there may be a plurality of bodies 8, for example positioned end to end, for joining a respective plurality of leading edge skin panels 4 to a respective plurality of wing box skin panels 6. This modularity of the body 8 of the apparatus 1 may provide design flexibility, and/or reduce the cost and complexity associated with replacement of one the apparatus 1, for example due to damage.

Although in the above examples the first skin panel 4 and the second skin panel 6 are each rebated so as to define the respective recesses 13, 15 in which the body is received, it will be appreciated that this need not necessarily be the case, and in other examples the recesses 13, 15 may take different forms. For example, the first skin panel 4 and/or the second skin 6 panel may comprise a joggle or other joint feature defining a recess in which the body 8 may be received. For example, the first skin panel and/or the second skin panel 6 may be joggle skin panels 4, 6. A joggle may be suited for example for examples in which the first skin panel and/or the second skin panel are of composite material.

Although in some of the above examples the body 8 is described as a joint strap 8 or butt strap 8 for joining a leading edge skin panel 4 and a wing box skin panel 6 of a wing 70 together, it will be appreciated that this need not necessarily be the case and that the body may be a joint strap 8 for joining any first skin panel 4 for an aircraft to any second skin panel 6 for an aircraft together.

Further, it will be appreciated that the body 8 need not necessarily be a joint strap or a but strap for joining skin panels 4, 6 together, and in other examples the body 8 may for receipt into a recess of any skin panel for an aircraft.

Figure 9:
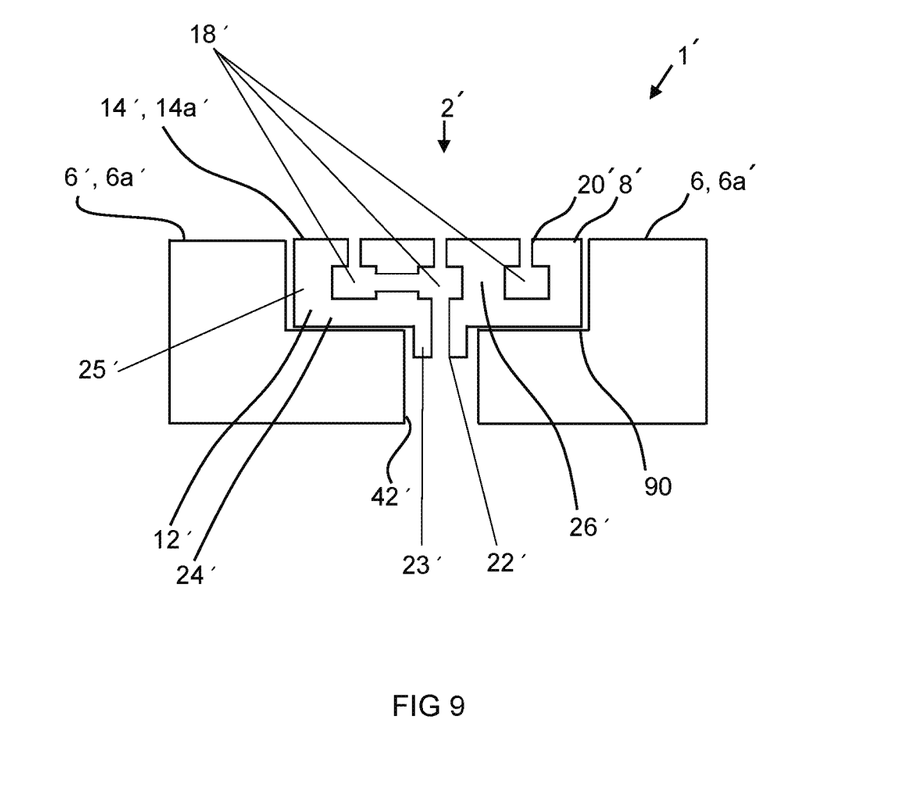
FIG. 9 illustrates schematically a cross-section of system comprising apparatus for laminar flow control, according to a second example.

FIG. 9 illustrates schematically a system 1' for laminar flow control comprising an apparatus 2' for laminar flow control, according to a second example. The apparatus 2' according to the second example illustrated in FIG. 9 is similar to the apparatus 2 according to the first example illustrates in FIGS. 1 to 6. Features that are the same or similar to the first example will not be described again in detail, but are given the same reference numerals as for the first example except followed by a prime (').

The apparatus 2' according to the second example differs from the apparatus 2 according to the first example in essence in that the body 8' of the apparatus 2' of the second example is not a joint strap for joining a first skin panel to a second skin panel, but is rather a body 8' for receipt into a recess 90, for example one recess 90, of a skin panel 6' for an aircraft, for example a wing box skin panel 6'. Further, the body 8' of the apparatus 2' according to the second example does not comprise apertures (e.g. apertures 34 of the first example) extending through the body 8' for receiving fasteners (e.g. fasteners 30 of the first example), but rather the body 8' is for bonding into the recess 90 of the skin panel 6', for example by application of suitable bonding agent between the skin panel 6' and the body 8'.

Referring to FIG. 9, the body 8' is received in the recess 90 of the skin panel 6'. The skin panel 6' may be for example a wing box skin panel 6' of a wing (not shown in FIG. 9 but e.g. the wing 70 FIG. 7) of an aircraft (not shown in FIG. 9 but e.g. the aircraft 80 of FIG. 8), although it will be appreciated that the skin panel 6' may be any skin panel 6' for an aircraft. The body 8' defines a chamber 18'. The body 8' comprises a support portion 12' and an outer portion 14'. The outer portion 14' defines a plurality of micro apertures 20' each in fluid communication with the chamber 18'. (It will be appreciated that the micro apertures 20' illustrated in FIG. 9 are exaggerated for illustration, and may for example have dimensions as for the micro apertures 20 of the first example). The support portion 12' comprises a base portion 24' having wall portions 25' and support members 26' extending therefrom to support the outer portion 14'. The chamber 18' is defined between the support portion 12' and the outer portion 14'. The support portion 12'defines one or more outlets 22' of the chamber 18', for fluid connection to a suction means (not shown, and which may be a suction means as described for the first example) that draws air from the chamber 18'.

The recess 90 extends part way into the skin panel 6'. The body 8' is received in the recess 90 such that only the outer portion 14' is exposed, that is, substantially all of a support portion 12' of the body 8' is received in the recess 90. An outer surface 14a' of the outer portion 14' of the body 8' is aligned (i.e. flush) with an outer surface 6a' of the skin panel 6'. The body 8' is bonded into the recess 90, for example by a suitable bonding agent (not shown) between the skin panel 6' and the body 8', for example between the skin panel 6' and the base portion 24' of the body 8'.

The skin panel 6' defines one or more apertures 42'. Each aperture 42' extends from the recess 90 to an inner surface 6c of the skin panel 6'. Each outlet 22' is located substantially at a corresponding aperture 42'. Each outlet 22' comprises a connecting means 23' for connecting the outlet 22' to the suction means (not shown). The connecting means 23' extends into the corresponding aperture 42', to allow for example a pipe (not shown) of the suction means to be attached thereto.

In use, for example when an aircraft (for example aircraft 80 of FIG. 8) comprising the laminar flow control system 1' is in flight, air flows over the outer surface 6a' of the first skin panel 6'. The airflow at the surface 6a' of the panel may break down into turbulent airflow as it travels over the surface 6a' of the panel 6'. However, the suction means (not shown) in fluid communication with the or each outlet 22' draws air from the chamber 18', which in turn draws air flowing at or near the outer surface 14a' through the micro apertures 20' and into the chamber 18'. This reduces airflow layer separation at the outer surface 14a' which otherwise may contribute to the breakdown of the laminar airflow to turbulent airflow. Turbulent airflow over the outer portion 14' and skin panels 6' may therefore be reduced, and correspondingly laminar airflow may therefore be promoted. This can reduce skin friction drag and hence improve efficiency, for example aircraft operation efficiency, for example fuel efficiency for the aircraft.

The recess 90 extending only part way into the skin panel 6' may allow for minimal structural impact of the recess 90 on the skin panel 6'. This may allow for minimal modification to the skin panel 6' to incorporate the laminar flow control apparatus 2' therein, and hence reduce complexity and cost associated therewith.

The recess 90 may be in any skin panel 6' of an aircraft, and accordingly the apparatus 2' may be located at any position on an aircraft. In one example, the skin panel 6' may be a skin panel 6' of a wing of an aircraft, for example a leading edge skin panel or a wing box skin panel of an aircraft wing. In other examples, the skin panel 6' may be a skin panel of a tail or the fuselage of an aircraft. The aircraft may be the aircraft 80 of FIG. 8, and the wing may be the wing 70 of FIG. 8.

The compact and modular nature of the apparatus 2' may provide for flexible implementation of the apparatus 2' at different positions (in recesses of different skin panels) of the aircraft, for example where desired or where the impact of the apparatus 2' on turbulent airflow reduction (laminar airflow promotion) may be the largest.

The apparatus 2' may be positioned such that in use the apparatus 2' is downstream of an airflow disturbance feature (not shown). For example, it may be determined from modelling or from field or laboratory tests that turbulent airflow is being caused at a given location of the surface of the aircraft 80'. This may be caused for example by a given airflow disturbance feature (not shown), i.e. a feature of the outer surface of the aircraft 80' that tends to cause turbulent airflow over the surface of the aircraft. Placing the apparatus 2' at a suitable position downstream (e.g. aft) of the airflow disturbance feature (not shown) can help reduce the turbulent flow caused by the airflow disturbance feature (i.e. help promote laminar airflow over the aircraft) and hence may help improve efficiency. Moreover, placing the apparatus 2' at a location where it may have most impact on reducing turbulent airflow (for example downstream of one or more aero disturbance features) may be more efficient (and less complex and costly) compared to installing a laminar flow control system across the entire aircraft.

It will be appreciated that both the first and the second examples described above provide a laminar flow control apparatus 2, 2' comprising a body or element 8, 8' for insertion into a recess 13, 15, 90 of a skin panel 4, 6, 6', of an aircraft 80, the element 8, 8' defining: a chamber or internal cavity 18, 18'; at least one micro aperture 20, 20' fluidically connecting the internal cavity 18, 18' to an exterior of the element 8, 8'; and at least one outlet 22, 22', in fluid communication with the internal cavity 18, 18', for connection to a suction means; wherein in use a said suction means connected to the at least one outlet 22, 22' in use draws air from the internal cavity 18, 18' thereby to cause air to be drawn in to the internal cavity 18, 18' from the exterior of the element 8, 8' via the at least one micro aperture 20, 20', thereby to encourage laminar flow of air over the element 8, 8' in use It is noted that the term "or" as used herein is to be interpreted to mean "and/or", unless expressly stated otherwise.

The above examples are to be understood as illustrative examples of the invention. For example, it is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A joint strap for controlling laminar flow over a skin of an aircraft, the joint strap configured to be received into a recess of the skin to join a first skin panel to a second skin panel, the joint strap comprising:
 a body defining a chamber, and the body comprising:

an outer portion configured to align with an outer surface of the skin panel when the body is received in the recess, the outer portion defining one or more micro apertures through the outer portion, each of the one or more micro apertures in fluid communication with the chamber; and a support portion configured to support outer portion, the support portion defining at least one outlet from the chamber for air drawn from the chamber by suction through the outlet, wherein the joint strap is arranged such that, in use, air is drawn through the one or more micro apertures into the chamber and out of the outlet, thereby to promote laminar airflow over the outer portion in use;

wherein the chamber is between a base portion and the outer portion, wherein the support portion comprises the base portion and at least one support member, wherein the at least one support members extends from the base portion and through the chamber to support the outer portion;

wherein the body comprises at least one fastener receiving portion configured to receive a respective fastener to fasten the body to the first skin panel or the second skin panel, and -each of the at least one fastener receiving portion comprises a respective one of the at least one support members.

2. The joint strap according to claim 1, wherein the outlet is defined in the base portion.

3. The joint strap according to claim 1, wherein the outlet comprises a connector configured to connect the outlet to a suction device.

4. The joint strap according claim 1, wherein the outer portion is integrally formed with the support portion, such that the outer portion and the support portion are a single piece component.

5. The joint strap according to claim 1, wherein the outer portion is bonded to the support portion.

6. The joint strap according to claim 1, wherein each of the one or more micro-apertures has a diameter in a range of 45 μm to 65 μm.

7. The joint strap according to claim 1, wherein the outer portion has a thickness in a range 0.8 mm to 1.0 mm.

8. The joint strap according to claim 1, wherein the apparatus is arranged for hybrid laminar flow control for an aircraft.

9. The joint strap according to claim 1, wherein one or more of the micro apertures are adjacent to one or more of the fastener receiving portions.

10. The joint strap according to claim 1, wherein one or more of the micro apertures are positioned such that in use the one or more micro apertures are immediately downstream of one or more of the fastener receiving portions.

11. The joint strap according to claim 1, wherein one or more of the at least one fastener receiving portions comprises a respective aperture in a respective one of the support members, wherein the aperture is configured to receive the respective fastener.

12. A system for laminar flow control for an aircraft, the system comprising:
a first skin panel comprising a first recess and a first edge adjacent the first recess;
a second skin panel comprising a second recess, wherein the second skin panel includes a second edge adjacent both the second recess and the first edge;
a joint strap seated in the first and second recesses and spanning between the first and second skin panels, the joint strap including:
an outer portion having an outer surface aligned with outer surfaces of the first and second skin panels, wherein the outer portion includes micro apertures open to the outer surface of the outer portion and open to an interior chamber of the joint strap;
a support portion supporting the outer portion, wherein the support portion includes a base portion opposite the outer portion, and support members within the interior chamber, wherein the support members span between the base portion and the outer portion;
a fastener receiving aperture in each of a plurality of the support members;
a fastener in each of the fastener receiving apertures, wherein each fastener secures the base portion to the first skin panel or the second skin panel; and
an outlet in the support portion and configured to be coupled to a suction source, wherein air is drawn through the micro-apertures, into the interior chamber and through the outlet by the suction source.

13. The system according to claim 12, wherein the first skin panel comprises a first recess in which a first portion of the body of the apparatus is received, and the second skin panel comprises a second recess in which a second portion of the apparatus is received.

14. The system according to claim 12, wherein an outer surface of the outer portion of the body of the apparatus is aligned with an outer surface of the first or second skin panel.

15. The system according to claim 12, wherein the first or second skin panel is one of a leading-edge skin panel for an aircraft wing and a wing box skin panel of an aircraft wing.

16. A laminar flow control apparatus comprising:
a joint strap configured to cover a gap between a first skin panel and a second skin panel of an aircraft, wherein the joint strap includes:
an internal cavity;
an outer portion including micro apertures providing fluid communication between the internal cavity and an outer surface of the joint strap, wherein the outer surface is aligned with an outer surface of the first and an outer surface of the second skin panel;
a support portion including a base portion opposite the outer portion, wherein the internal cavity is between the base portion and the outer portion,
support members spanning between the base portion and the outer portion, and the support members are within the internal cavity,
a fastener receiving aperture in each of a plurality of the support members;
fasteners each in a respective one of the fastener receiving apertures, wherein a first fastener of the fasteners secures the joint strap to the first skin panel and a second fastener of the fasteners secures the joint strap to the second skin panel; and
at least one outlet extending through the base portion, in fluid communication with the internal cavity, and configured to be connected to a suction source;
wherein, the suction source, while connected to the at least one outlet, draws air from the internal cavity causing air to be drawn in to the internal cavity from the exterior of the joint strap via the at least one micro aperture.

17. A skin panel assembly for an aerodynamic structure of an aircraft, the skin panel assembly including:

a first skin panel including a first outer surface, a first recess in the first outer surface, and a first edge adjacent the first recess;

a second skin panel including a second outer surface, a second recess in the second outer surface, and a second edge adjacent the second recess and adjacent the first recess of the first skin panel;

a joint strap spanning a gap between the first and second edges of the first and second skin panels, wherein the joint strap is seated in the first and second recesses and the joint strap includes:
- a third outer skin surface aligned with the first and second outer surfaces;
- micro-apertures in the third outer skin surface;
- an internal chamber within the joint strap, wherein the micro-apertures are in fluid communication with the internal chamber, wherein the internal chamber overlaps at least partially the first and second recesses;
- a base portion opposite to the third outer skin surface, wherein the internal chamber is between the base portion and the third outer skin surface,
- support members spanning between the base portion and the third outer skin surface, wherein the support members are within the internal chamber,
- a fastener receiving aperture in each of a plurality of the support members,
- fasteners each in a respective one of the fastener receiving apertures, wherein a first fastener of the fasteners secures the joint strap to the first skin panel and a second fastener of or the fasteners secures the joint strap to the second skin panel, and
- an outlet port in fluid communication with the internal chamber and connectable to a suction source.

18. The skin panel assembly of claim 17, wherein the joint strap further includes:
an outer panel portion having one face forming the third outer surface and an opposite face defining a wall of the internal chamber.

19. The skin panel assembly of claim 17, further comprising wherein the fastener receiving aperture is separated from the internal chamber such that air from the internal chamber is isolated from the fastener receiving aperture.

* * * * *